(12) United States Patent
Tsubota et al.

(10) Patent No.: US 8,872,446 B2
(45) Date of Patent: Oct. 28, 2014

(54) WELDING METHOD AND SUPERCONDUCTING ACCELERATOR

(75) Inventors: Shuho Tsubota, Tokyo (JP); Katsuya Sennyu, Tokyo (JP); Fumiaki Inoue, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/518,575

(22) PCT Filed: Feb. 10, 2011

(86) PCT No.: PCT/JP2011/052875
§ 371 (c)(1),
(2), (4) Date: Jun. 22, 2012

(87) PCT Pub. No.: WO2011/102295
PCT Pub. Date: Aug. 25, 2011

(65) Prior Publication Data
US 2012/0256563 A1     Oct. 11, 2012

(30) Foreign Application Priority Data

Feb. 17, 2010    (JP) .................................. 2010-032515

(51) Int. Cl.
*H05H 7/00*     (2006.01)
*B23K 26/08*    (2014.01)
*B23K 26/06*    (2014.01)
*H05H 7/20*     (2006.01)
*B23K 26/14*    (2014.01)
*H05H 7/22*     (2006.01)

(52) U.S. Cl.
CPC .............. *H05H 7/20* (2013.01); *B23K 26/0823* (2013.01); *B23K 26/0626* (2013.01); *B23K 26/1458* (2013.01); *H05H 7/22* (2013.01)
USPC ........... 315/501; 315/500; 315/502; 315/503; 315/504; 219/121.6; 219/121.64

(58) Field of Classification Search
USPC .............................. 315/500–506; 219/121.64
See application file for complete search history.

(56) References Cited

U.S. PATENT DOCUMENTS 5,239,157 A * 8/1993 Sakano et al. ........... 219/121.64
6,229,111 B1 * 5/2001 McCay et al. ........... 219/121.59

(Continued)

FOREIGN PATENT DOCUMENTS

JP        3-135000       6/1991
JP        05-245670      9/1993

(Continued)

OTHER PUBLICATIONS

International Search Report issued Mar. 8, 2011 in International (PCT) Application No. PCT/JP2011/052875.

(Continued)

*Primary Examiner* — Douglas W Owens
*Assistant Examiner* — Srinivas Sathiraju
(74) *Attorney, Agent, or Firm* — Wenderoth, Lind & Ponack, L.L.P.

(57) ABSTRACT

A welding method of welding a cylindrical stiffening member to an outer circumference of a superconducting accelerator tube body uses a laser beam in a process of manufacturing a superconducting accelerator tube. The laser beam is configured such that a distribution profile of energy density on an irradiated face to which the laser beam is irradiated is a Gaussian distribution profile having a peak section, and the energy density of the peak section is $5.8 \times 10^5$ W/cm$^2$ or more.

16 Claims, 10 Drawing Sheets

(56) References Cited

U.S. PATENT DOCUMENTS

| | | | |
|---|---|---|---|
| 6,348,757 B1 * | 2/2002 | Marini | 313/359.1 |
| 7,491,909 B2 * | 2/2009 | Yamamoto et al. | 219/121.61 |
| 8,038,828 B2 * | 10/2011 | Terada et al. | 156/272.8 |
| 2012/0094839 A1 * | 4/2012 | Khare et al. | 505/210 |

FOREIGN PATENT DOCUMENTS

| | | |
|---|---|---|
| JP | 06-190575 | 7/1994 |
| JP | 08-224679 | 9/1996 |
| JP | 08-332582 | 12/1996 |
| JP | 2000-260599 | 9/2000 |
| JP | 3959198 | 8/2007 |
| JP | 2010-23047 | 2/2010 |

OTHER PUBLICATIONS

Written Opinion of the International Searching Authority issued Mar. 8, 2011 in International (PCT) Application No. PCT/JP2011/052875.

Canadian Office Action issued Nov. 15, 2013 in corresponding Canadian Patent Application No. 2,785,685.

Carlos B. Roundy, Ph.D., "Current Technology of Laser Beam Profile Measurements", Commercial Technical Publication, pp. 1-43, 2004, www.ophiropt.com/user_files/laser/beam_profilers/tutorial-1.pdf.

* cited by examiner

| SPECIMEN NO. | AVERAGE OUTPUT (W) | $E_{max}$ (W/cm²) | $E_{50}$ (W/cm²) | $E_{86}$ (W/cm²) | BEAD APPEARANCE 0 5 [mm] | FORMATION OF WELD PENETRATION |
|---|---|---|---|---|---|---|
| HS-10 | 3800 | $5.9 \times 10^5$ | $4.3 \times 10^5$ | $2.0 \times 10^5$ | | GOOD |
| HS-9 | 3600 | $5.6 \times 10^5$ | $4.0 \times 10^5$ | $1.9 \times 10^5$ | | BAD |
| HS-8 | 3500 | $5.4 \times 10^5$ | $3.9 \times 10^5$ | $1.9 \times 10^5$ | | BAD |

WELDING METHOD AND SUPERCONDUCTING ACCELERATOR

TECHNICAL FIELD

The present invention relates to a welding method used in the process of manufacturing a superconducting accelerator tube and a superconducting accelerator having the superconducting accelerator tube.

This application claims priority to and the benefits of Japanese Patent Application No. 2010-032515 filed on Feb. 17, 2010, the disclosure of which is incorporated herein by reference.

BACKGROUND ART

In the related art, in the process of manufacturing a superconducting accelerator tube, electron-beam welding is carried out to weld members. The electron-beam welding is accompanied with many additional tasks because vacuum drawing is essential, and positioning requires more time than welding in the air.

On the other hand, laser welding enables welding procedures in the air, and is applied to the process of manufacturing the superconducting accelerator tube, so that efficient manufacturing can be expected.

Patent Document 1 discloses a manufacturing method in which, on a butt weld zone of a straight pipe for a superconducting cavity, a groove has a stepped shape, and non-piercing welding is conducted from an inside and then non-piercing welding is conducted from an outside by a laser beam.

PRIOR ART DOCUMENT

Patent Document

Patent Document 1: Japanese Patent No. 3959198

SUMMARY OF THE INVENTION

Problems to be Solved by the Invention

Since partial penetration welding is performed so that a welded part does not penetrate a base metal, a blowhole (air bubble) is easily generated from the welded part. To prevent the blowhole from being generated, defocusing a beam so that an aspect ratio (depth/width) of a penetration geometry is reduced has been considered. However, when a metal such as niobium (Nb, melting point of about 2500° C.) whose melting point is higher than those of other metals is used as a base metal, and when the beam is defocused, it is difficult to melt the metal and thus to perform welding.

Further, when welding is performed using a high peak beam in order to melt a high melting-point metal such as niobium, the width of a bead is narrowed, and the blowhole is more easily generated. In the partial penetration welding, since the curvature of a bead bottom is reduced, there is a risk of the bead penetrating the base metal or of a convexity being formed on a reverse face of a welding face. Accordingly, a quality of the superconducting accelerator tube cannot be stably secured.

Furthermore, in the laser welding, despite the possibility of the welding procedures in the air, when niobium is used, which is particularly susceptible to oxidation, it is difficult to prevent the oxidation to perform the welding procedures of high quality.

The present invention has been made keeping in mind the above problems occurring in the related art, and an object of the present invention is to provide a welding method of preventing a blowhole from being generated and allowing a high quality of partial penetration welding without a bead penetrating a base metal and without a convexity being formed on a reverse face of a welding face, and a superconducting accelerator having a superconducting accelerator tube produced by the welding method.

Means for Solving the Problems

To achieve the object, the present invention provides a welding method, in which, when a cylindrical stiffening member is welded to an outer circumference of a superconducting accelerator tube body using a laser beam in a process of manufacturing a superconducting accelerator tube, the laser beam is configured such that a distribution profile of energy density on an irradiated face to which the laser beam is irradiated is a Gaussian distribution profile having a peak section, and the energy density of the peak section is $5.8 \times 10^5$ W/cm$^2$ or more.

In the present invention, since the energy density of the peak section is $5.8 \times 10^5$ W/cm$^2$ or more, even when the superconducting accelerator tube body and the stiffening member are formed of a metal material having a high melting point, they can be sufficiently melted.

The laser beam is configured such that the distribution profile of energy density is the Gaussian distribution profile. Thereby, a weld zone between the superconducting accelerator tube body and the stiffening member is configured such that a circumferential surface of a keyhole has a smooth shape and a bead having a small aspect ratio is formed. This causes air bubbles in the molten metal to be easily floated and discharged, and prevents the molten metal from flowing into and collapsing the keyhole and entangling the air bubbles. As a result, it is possible to inhibit the generation of the blowholes.

Further, the laser beam is configured such that the distribution profile of energy density is the Gaussian distribution profile. Thereby, partial penetration welding can be performed without a bead penetrating the superconducting accelerator tube body and without a convexity being formed inside the superconducting accelerator tube body.

Since the metal can be melted at the peak section, and since the energy of an outer edge section, which has a lower energy density than the peak section, can also be applied to the melting of the metal, an absorption characteristic of energy can be improved.

In the welding method of the present invention, the energy density of an outer circumference of a region in which 50% of the total energy in the distribution profile of energy density is included centered on the peak section may be less than or equal to 75% of the energy density of the peak section.

In this case, the distribution of energy density from the peak section toward the outer edge section becomes smooth, and the absorption characteristic of energy on the outer edge section can be improved.

Further, in the welding method of the present invention, the superconducting accelerator tube body and the stiffening member may be formed of niobium.

In this case, performance of the formed superconducting accelerator tube and a superconducting accelerator having the superconducting accelerator tube can be improved.

Further, in the welding method of the present invention, an inert gas may be supplied to the irradiated face, the front and rear of the irradiated face in a welding direction, and a reverse face of the irradiated face inside the superconducting accelerator tube body.

In this case, since the irradiated face, the front and rear of the irradiated face, and the reverse face of the irradiated face inside the superconducting accelerator tube body can be under an inert gas atmosphere, the superconducting accelerator tube body and the stiffening member can be prevented from being oxidized. Further, even when the superconducting accelerator tube body and the stiffening member are made of a metal having a high oxidation tendency, their oxidation can be prevented.

Further, in the welding method of the present invention, the inert gas may be supplied from a center nozzle installed so as to surround the laser beam, a front nozzle installed in front of the center nozzle in the welding direction, a rear nozzle installed in the rear of the center nozzle in the welding direction, and a reverse face-side nozzle installed toward the reverse face of the irradiated face inside the superconducting accelerator tube body.

In this case, the inert gas can be stably supplied to the irradiated face of the laser beam, the front and rear of the irradiated face in the welding direction, and the reverse face of the irradiated face inside the superconducting accelerator tube body.

Further, in the welding method of the present invention, the inert gas may be supplied between the stiffening member and the superconducting accelerator tube body.

In this case, the inside of the stiffening member and the superconducting accelerator tube body can be prevented from being oxidized.

Further, in the welding method of the present invention, a partition plate may be installed between the stiffening member and the superconducting accelerator tube body so as to partition a space in a circumferential direction, and the stiffening member may include a supply port through which the inert gas is supplied to an inside thereof on one side of the circumferential direction of the partition plate, and a discharge port that discharges gas of the inside thereof on the other side of the circumferential direction of the partition plate.

In this case, the inert gas supplied from the supply port to the inside of the stiffening member moves in the space between the stiffening member and the superconducting accelerator tube body in the circumferential direction, and is discharged from the discharge port. As such, the space between the stiffening member and the superconducting accelerator tube body can be under an inert gas atmosphere.

Further, in the welding method of the present invention, the superconducting accelerator tube body and the stiffening member may be installed so that central axes thereof are in a horizontal direction. The laser beam may be irradiated to an upper side above the central axes of the superconducting accelerator tube body and the stiffening member. The superconducting accelerator tube body and the stiffening member may be rotated about the central axes in a direction opposite to a direction directed toward the laser beam from an upper end of the superconducting accelerator tube.

In this case, the metal melted by irradiation of the laser beam moves toward the upper side due to the rotation of the superconducting accelerator tube body and the stiffening member, and is solidified. Thus, the metal does not flow toward the irradiated face to which the laser beam is irradiated. As such, the welding can be efficiently performed.

Further, a superconducting accelerator of the present invention provides the superconducting accelerator tube manufactured by any one of the welding methods described above.

In the present invention, since the superconducting accelerator includes the superconducting accelerator tube manufactured by any one of the welding methods described above, the quality of the superconducting accelerator can be stabilized.

Effects of the Invention

According to the present invention, the metal material forming the superconducting accelerator tube body and the stiffening member can be melted by the peak section of the laser beam. On the weld zone between the superconducting accelerator tube body and the stiffening member, the circumferential surface of the keyhole has a smooth shape, and the bead having a small aspect ratio is formed. This suppresses the generation of the blowholes, and allows the partial penetration welding to be carried out without the beads penetrating the body of the superconducting accelerator tube body or without the convexity being formed on the reverse face of the welding face of the superconducting accelerator tube body. As a result, the superconducting accelerator tube body and the stiffening member can be efficiently welded, and the manufactured superconducting accelerator tube and superconducting accelerator can be stabilized in quality.

DETAILED DESCRIPTION OF THE INVENTION

A welding method according to a first embodiment of the present invention will be described below with reference to FIGS. 1 to 8.

First, a superconducting accelerator tube according to a first embodiment will be described.

As shown in FIGS. 1(a) and 1(b), the superconducting accelerator tube 1 includes a tube body (superconducting accelerator tube body) 3 composed of a plurality of half cells 2 joined by welding, and stiffening rings (stiffening members) 4 stiffening the tube body 3.

Each half cell 2 is obtained by pressing a planar superconducting material formed of niobium and the like, in a bowl shape so as to have an opening in the center thereof. Minor-diameter-side ends 2a of two of the half cells 2 are joined to form a dumbbell-shaped member 5 (see FIG. 1(a)). A plurality of dumbbell-shaped members 5 are joined in an axial direction, thereby forming the tube body 3.

The tube body 3 includes concave iris sections 6 and convex equator sections 7 on an outer circumference thereof, and has a corrugated shape in an axial cross section (see FIG. 1(a)) and an annular shape in a radial cross section (see FIG. 1(b)).

The stiffening rings 4 are cylindrical members that are formed of a superconducting material such as niobium and the like, and are installed so as to cover the iris sections 6, and are intended to stiffen the tube body 3. Each stiffening ring 4 is formed in a cylindrical shape in which two semi-cylindrical members are assembled, and is configured so that axial ends 4a thereof are welded adjacent to each iris section 6.

Each stiffening ring 4 may be configured so that three or more members into which a cylinder is divided in a radial direction are assembled. Further, a gap between the members constituting the stiffening ring 4 may be provided.

The superconducting accelerator tube 1 having the aforementioned configuration is used as a member for a superconducting accelerator (not shown).

Next, a method of manufacturing the superconducting accelerator tube according to the first embodiment will be described with reference to the drawings.

First, a planar material of pure niobium is pressed in a bowl shape so as to have an opening in the center thereof, thereby forming a half cell 2 as shown in FIGS. 1(a) and 1(b). Minor-diameter-side ends 2a of two half cells 2 are joined to form a dumbbell-shaped member 5.

Then, the dumbbell-shaped member 5 and the stiffening ring 4 are welded.

In detail, the dumbbell-shaped member 5 and the stiffening ring 4 are welded by attaching ends 4a of the stiffening ring 4 to an outer circumferential surface of the dumbbell-shaped member 5.

In this case, if a weld bead or a convexity due to welding is formed inside the dumbbell-shaped member, the superconducting accelerator is reduced in quality. As such, the welding between the dumbbell-shaped member 5 and the stiffening ring 4 is partial penetration welding based on a laser beam from the outside, and furthermore prevents any convexity from being formed inside the dumbbell-shaped member 5.

As the welding between the dumbbell-shaped member 5 and the stiffening ring 4, laser welding based on a beam having the distribution of energy density as shown in FIG. 3(c) is employed. Hereinafter, this beam is referred to as a defocusing beam (laser beam) 11. This defocusing beam 11 will be described below.

The defocusing beam 11 is irradiated to melt a point of a weld zone 8 of the dumbbell-shaped member 5 and the stiffening ring 4. The dumbbell-shaped member 5 and the stiffening ring 4 are rotated about the central axis 9 thereof, and the defocusing beam 11 is irradiated to the entire weld zone 8. Thereby, the dumbbell-shaped member 5 and the stiffening ring 4 are welded.

Then, a plurality of dumbbell-shaped members 5 to which the respective stiffening rings 4 are welded are joined in an axial direction, and thus the superconducting accelerator tube 1 is completed.

Next, the defocusing beam used in the welding method according to the first embodiment will be described in comparison with a just focusing beam.

Figure 1:
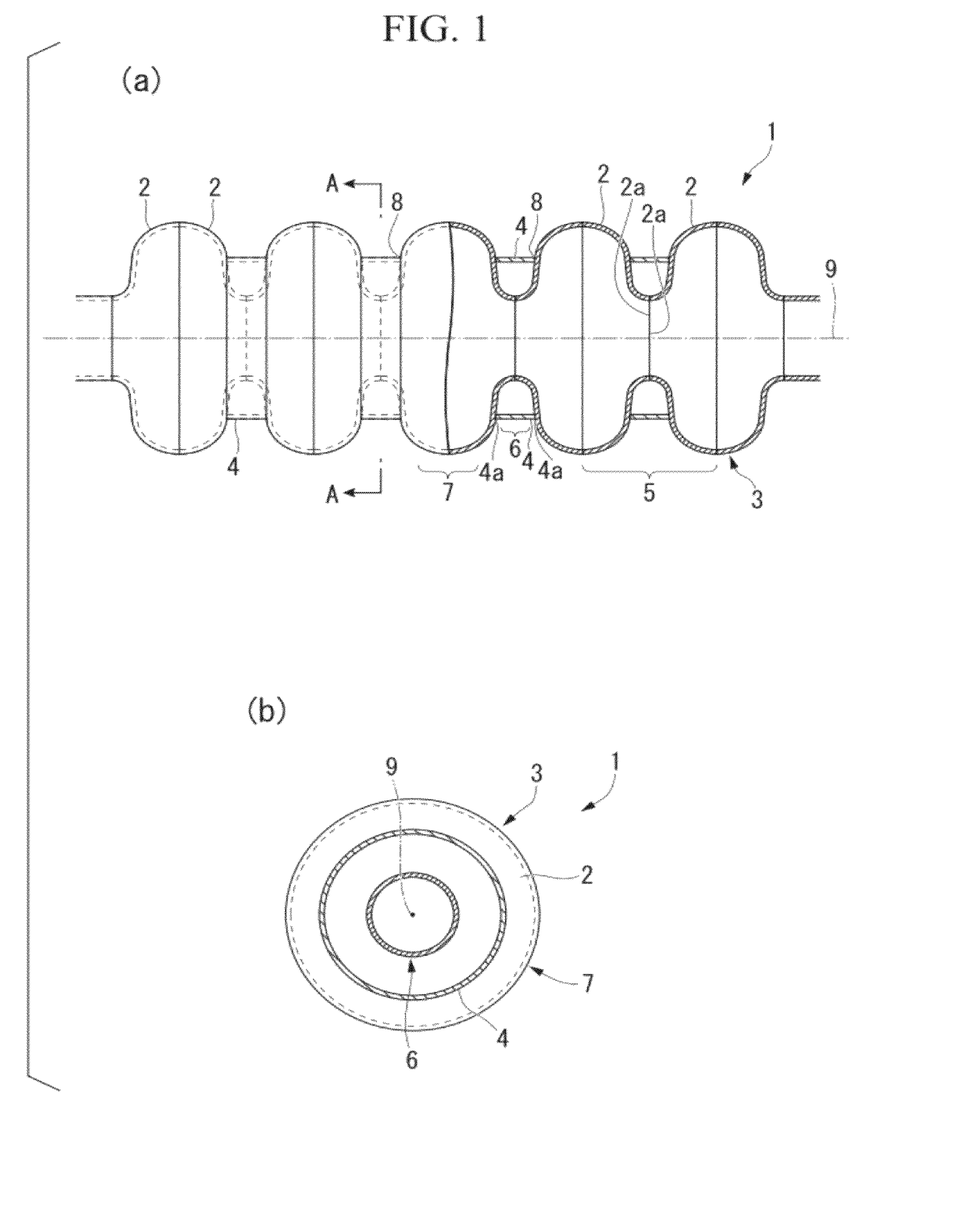
FIG. 1(a) shows an example of a superconducting accelerator tube according to a first embodiment of the present invention.
FIG. 1(b) is a cross-sectional view taken along line A-A of FIG. 1(a).
Figure 2:
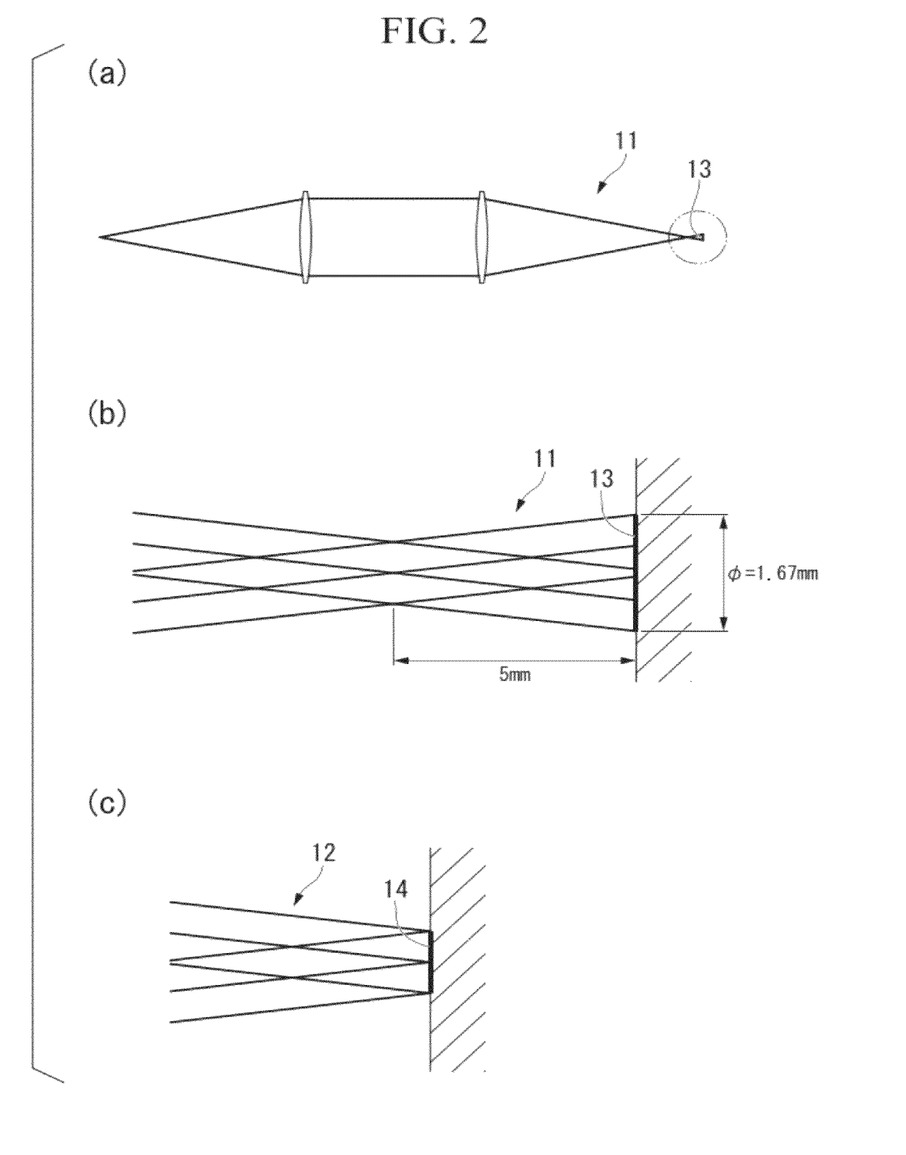
FIG. 2(a) shows a shape of a defocusing beam.
FIG. 2(b) is an enlarged view of an irradiated face of the defocusing beam of FIG. 2(a)
FIG. 2(c) is an enlarged view of an irradiated face of a just focusing beam.
Figure 3:
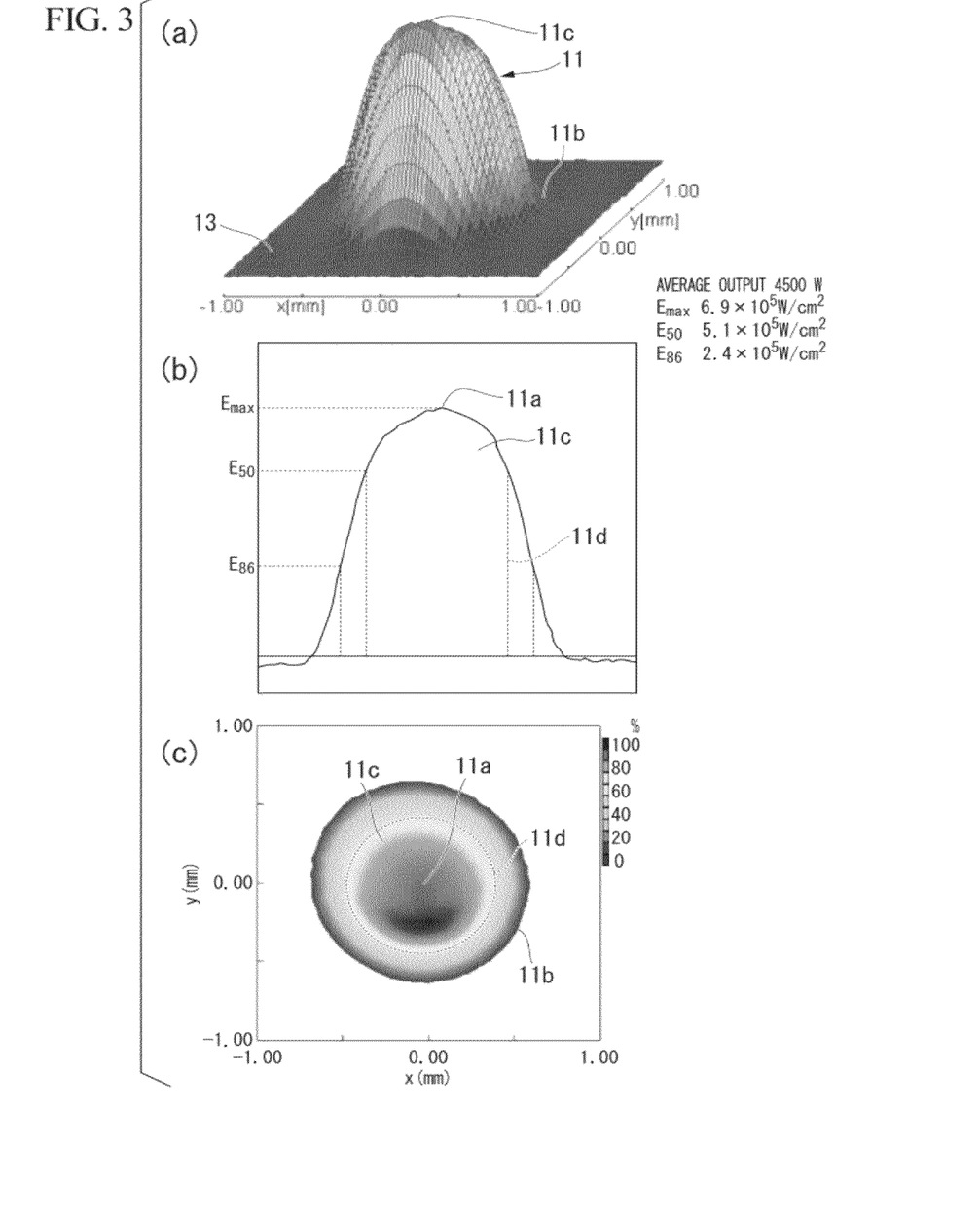
FIG. 3(a) is a three-dimensional view showing an energy distribution profile of the irradiated face of the defocusing beam according to the first embodiment.
FIG. 3(b) is a cross-sectional view taken in an irradiating direction including the peak section of FIG. 3(a)
FIG. 3(c) is an energy distribution view of the irradiated face.

The defocusing beam 11 is formed into a beam having the distribution of energy density as shown in FIG. 3 by shifting a focus of the laser beam as shown in FIGS. 2(a) and 2(b) or by changing a lens shape. In the present embodiment, the defocusing beam 11 is formed by shifting the focus. For example, the defocusing beam 11 may be formed such that, when a lens having a focal length of 200 mm is used, a defocusing amount is +5 mm, and a laser beam diameter $\Phi$ is about 1.67 mm.

Figure 4:
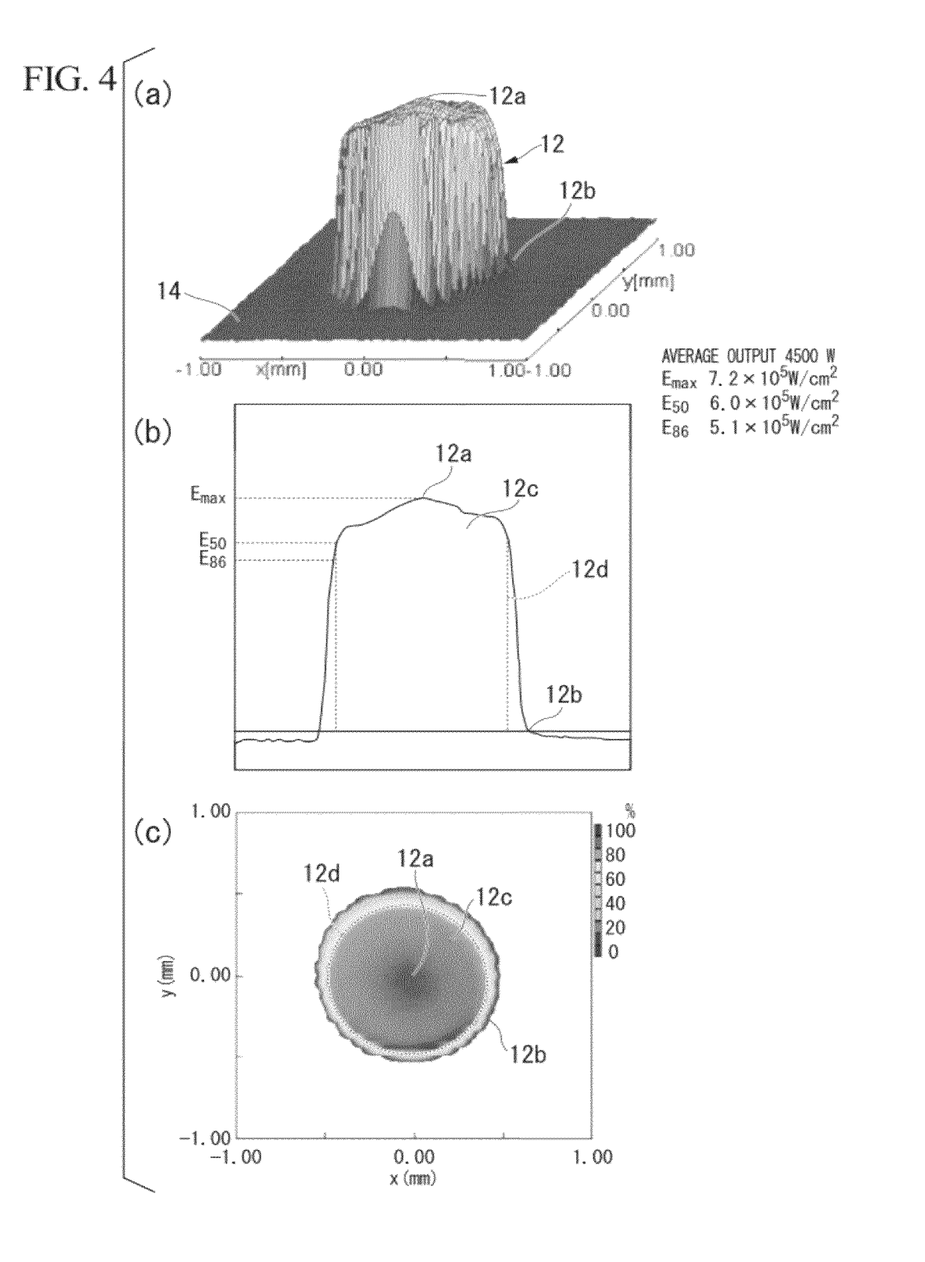
FIG. 4(a) is a three-dimensional view showing an energy distribution profile of the irradiated face of the just focusing beam.
FIG. 4(b) is a cross-sectional view taken in an irradiating direction including the peak section of FIG. 4(a)
FIG. 4(c) is an energy distribution view of the irradiated face.
Figure 5:
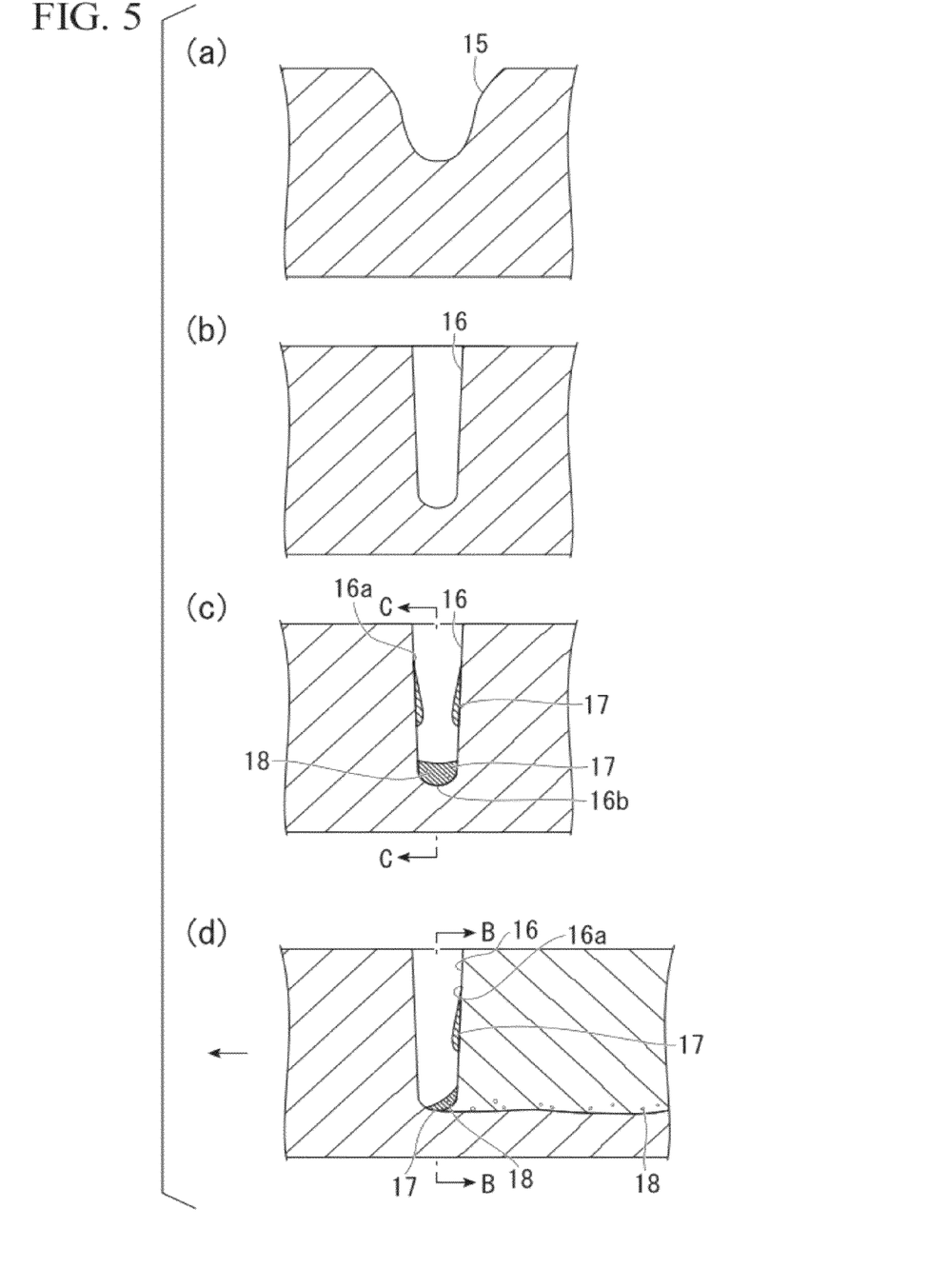
FIG. 5(a) shows a shape of weld penetration and a keyhole when welding is performed using the defocusing beam.
FIG. 5(b) shows a shape of weld penetration and a keyhole when welding is performed using the just focusing beam.
FIG. 5(c) is a cross-sectional view taken along line B-B of FIG. 5(d) and explaining a state of sidewalls of the keyhole when the welding is performed using the just focusing beam.
FIG. 5(d) is a cross-sectional view taken along line C-C of FIG. 5(c).

In welding of the related art, a beam having the distribution of energy density as shown in FIG. 4 is used. Hereinafter, this beam is referred to as a just focusing beam (laser beam) 12. The just focusing beam 12 is a beam formed by adjusting a focus as shown in FIG. 2(c).

Here, the following description will be made under the assumptions that the defocusing beam 11 is irradiated and thus a face perpendicular to the irradiated direction is an irradiated face 13, and that the just focusing beam 12 is irradiated and thus a face perpendicular to the irradiated direction is an irradiated face 14.

When the defocusing beam 11 represents a distribution profile of energy density on the irradiated face 13, the central portion of the irradiated face 13 has a Gaussian distribution profile (i.e., a bell-shaped three-dimensional profile as shown in FIG. 3(a), and a bell curve as shown in FIG. 3(b)) in which the energy density E is high, as shown in FIG. 3. In contrast, when the just focusing beam 12 represents a distribution profile of energy density E on the irradiated face 14, the central portion of the irradiated face 14 has approximately a cylindrical profile in which the energy density E has a small difference, as shown in FIG. 4(a).

Any of the laser beams has an average output of 4500 W and a speed of 2.0 m/min.

When the defocusing beam 11 is compared with the just focusing beam 12, the defocusing beam 11 has a greater diameter than the just focusing beam 12, as shown in FIGS. 3 and 4.

Further, the defocusing beam 11 has a peak section 11a of the energy density E at the central section thereof. Similarly, the just focusing beam 12 has a peak section 12a of the energy density E at the central section thereof. Between the energy densities of the peak sections 11a and 12a (hereinafter, each is referred to as "peak energy density $E_{max}$"), there is no great difference. However, the energy density E of the defocusing beam 11 is smoothly reduced from the peak section 11a toward an outer edge section 11b, whereas the energy density E of the just focusing beam 12 is hardly reduced from the peak section 12a toward an outer edge section 12b.

Here, as shown in FIGS. 3(b) and 3(c), the energy density of an outer circumference 11d of a region 11c in which 50% of the total energy is included centered on the peak section 11a is set as energy density $E_{50}$. Similarly, as shown in FIGS. 4(b) and 4(c), the energy density of an outer circumference 12d of a region 12c in which 50% of the total energy is included centered on the peak section 12a is set as energy density $E_{50}$. Then, a fraction of the energy density $E_{50}$ with respect to the peak energy density $E_{max}$ in the defocusing beam 11 is compared with that in the just focusing beam 12.

The defocusing beam 11 according to the present embodiment has the peak energy density $E_{max}$ of $6.9 \times 10^5$ W/cm², the energy density $E_{50}$ of $5.1 \times 10^5$ W/cm², and the fraction of the energy density $E_{50}$ with respect to the peak energy density $E_{max}$ of 73.9%.

Moreover, the fraction of the energy density $E_{50}$ with respect to the peak energy density $E_{max}$ in the defocusing beam 11 is preferably set to 75% or less.

Further, the defocusing beam 11 has energy density $E_{86}$ of $2.4 \times 10^5$ W/cm². A fraction of the energy density $E_{86}$ with respect to the peak energy density $E_{max}$ in the defocusing beam 11 is 34.8%. Note that the energy density $E_{86}$ is energy density of an outer circumference of a region in which 86% of the total energy is included centered on the peak section 11a.

In contrast, the just focusing beam 12 has the peak energy density $E_{max}$ of $7.2 \times 10^5$ W/cm², the energy density $E_{50}$ of $6.0 \times 10^5$ W/cm², and the fraction of the energy density $E_{50}$ with respect to the peak energy density $E_{max}$ of 83.3%.

Further, the just focusing beam 12 has energy density $E_{86}$ of $5.1 \times 10^5$ W/cm². A fraction of the energy density $E_{86}$ with respect to the peak energy density $E_{max}$ in the just focusing beam 12 is 70.8%.

In this case, any of the defocusing beam 11 and the just focusing beam 12 is set such that the peak energy density $E_{max}$ has a value of $5.8 \times 10^5$ W/cm² or more, preferably $6.0 \times 10^5$ W/cm² or more. In this manner, the peak energy density $E_{max}$ is set to a value greater than $5.8 \times 10^5$ W/cm². Thereby, niobium having a melting point of about 2500° C. can be melted.

When the welding is performed using the aforementioned defocusing beam 11, the peak section 11a evaporates and melts the metal, and the outer edge section 11b holds a molten state of the metal but does not further evaporate the metal. As such, a keyhole 15 as shown in FIG. 5(a) is smoothly formed in a wide range.

In contrast, when the welding is performed using the just focusing beam 12, the peak section 12a as well as the outer edge section 12b melts the metal. As such, a deep keyhole 16 as shown in FIG. 5(b) is formed in a narrow range.

In the welding based on this just focusing beam 12, as shown in FIGS. 5(c) and 5(d), metals 17 into which sidewalls 16a of the keyhole 16 located on lateral and rear sides in a welding direction (an arrow direction of FIG. 5(d)) are melted are easy to move toward a bottom 16b of the keyhole 16. With this movement, air bubbles enter to become blowholes 18.

Further, in the welding based on this just focusing beam 12, since the keyhole 16 is deep, there is a risk of a bead penetrating the metal or a convexity being formed on a reverse face of the welding face.

Next, an operation of the welding method according to the first embodiment will be described using the figures.

According to the welding method of the first embodiment, the welding is performed using the defocusing beam 11 in which the distribution profile of energy density on the irradiated face 13 is the Gaussian distribution profile and furthermore the fraction of the energy density $E_{50}$ with respect to the peak energy density $E_{max}$ is 75% or less. As such, in comparison with the welding based on the just focusing beam 12 of the same average output, it is possible to form the beads having a small aspect ratio which can form the smooth keyhole in a wide range. As a result, the air bubbles in the metal melted into the weld zone 8 are easily floated and discharged, and the metals melted into the sidewalls of the keyhole flows and prevents the air bubbles from being entangled therein. Thus, it is possible to inhibit the generation of the blowholes 18.

Further, since the bead having a small aspect ratio is formed, and since an evaporation reaction force for forming the keyhole is weak, the partial penetration welding can be performed without the keyhole and the beads penetrating the dumbbell-shaped member 5 or without the convexity being formed on the reverse face of the welding face of the dumbbell-shaped member 5.

Further, since the defocusing beam 11 is configured such that the peak section 11a has the peak energy density $E_{max}$ of $5.8 \times 10^5$ W/cm² or more, the defocusing beam 11 can sufficiently melt even a metal having a high melting point such as niobium.

In the welding method according to the first embodiment, since the welding is performed using the defocusing beam 11, the blowholes 18 of the weld zone 8 can be suppressed, and the partial penetration welding can be performed without the beads penetrating the dumbbell-shaped member 5 or without the convexity being formed on the reverse face of the welding face of the dumbbell-shaped member 5. As such, the superconducting accelerator tube 1 can be efficiently manufactured. Further, this stabilizes a quality of the superconducting accelerator tube 1 and a quality of the superconducting accelerator having the superconducting accelerator tube 1.

Further, since the metal can be melted by the peak section 11a, and since the energy of the outer edge section side having a lower energy density E than the peak section 11a can also be applied to the molten metal, an absorption characteristic of energy can be improved.

Next, the dumbbell-shaped member 5 formed of niobium and the stiffening ring 4 are welded using a defocusing beam having a distribution profile of energy density that is different from that of the defocusing beam 11 according to the first embodiment, and then a relationship between the peak energy density $E_{max}$ and the fraction of the energy density $E_{50}$ with respect to the peak energy density $E_{max}$ and a welded state is checked.

Figure 6:
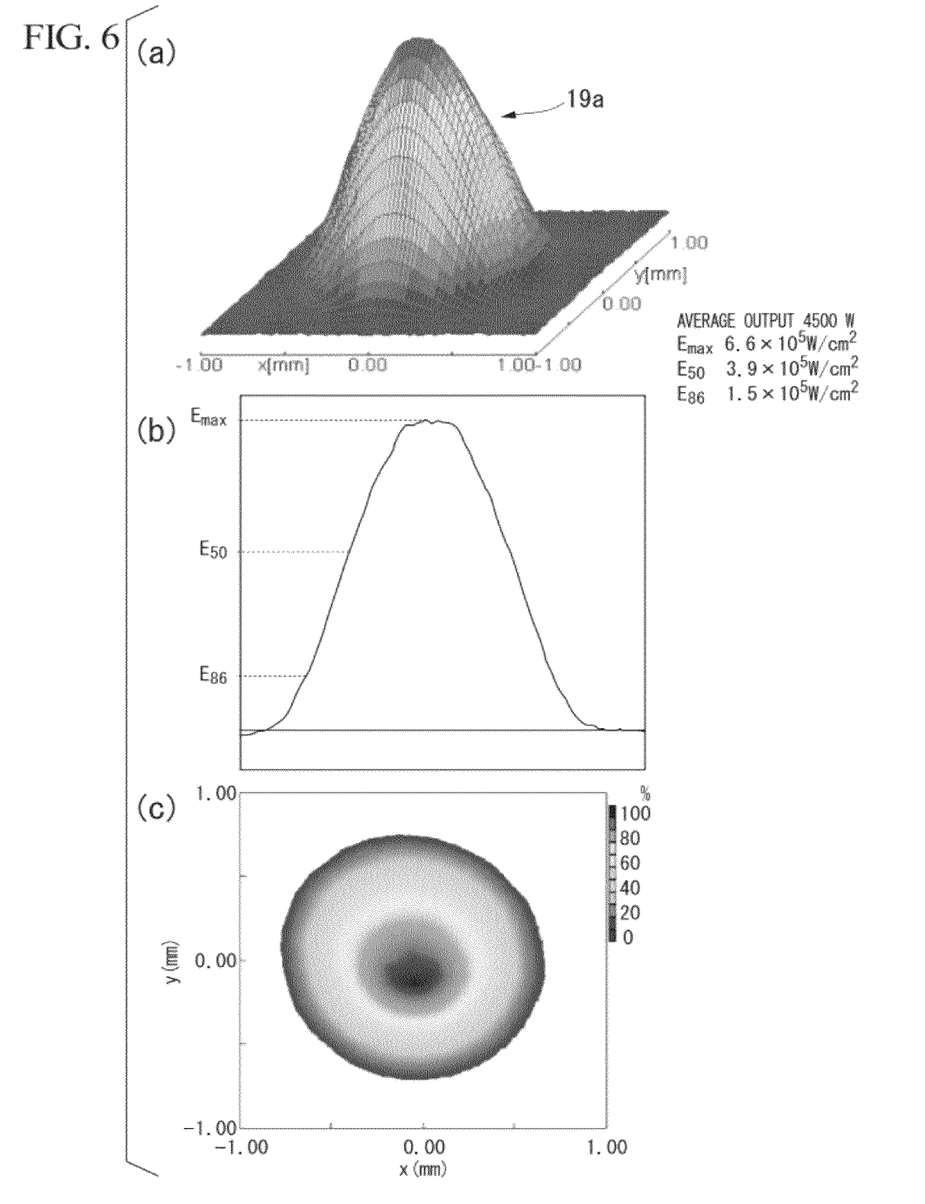
FIG. 6(a) is a three-dimensional view showing an energy distribution profile of the irradiated face of the defocusing beam according to another embodiment.
FIG. 6(b) is a cross-sectional view taken in an irradiating direction including the peak section of FIG. 6(a)
FIG. 6(c) is an energy distribution view of the irradiated face.

The defocusing beam 19a shown in FIG. 6 has an average output of 4500 W, a peak energy density $E_{max}$ of $6.6 \times 10^5$ W/cm², and an energy density $E_{50}$ of $3.9 \times 10^5$ W/cm². A fraction of the energy density $E_{50}$ with respect to the peak energy density $E_{max}$ is 59.1%, and a fraction of the energy density $E_{86}$ with respect to the peak energy density $E_{max}$ is 22.7%.

In the welding based on the defocusing beam 19a, the dumbbell-shaped member 5 and the stiffening ring 4 can be welded, no bead penetrates the dumbbell-shaped member 5, or no convexity is formed on the reverse face of the welding face of the dumbbell-shaped member 5.

Figure 7:
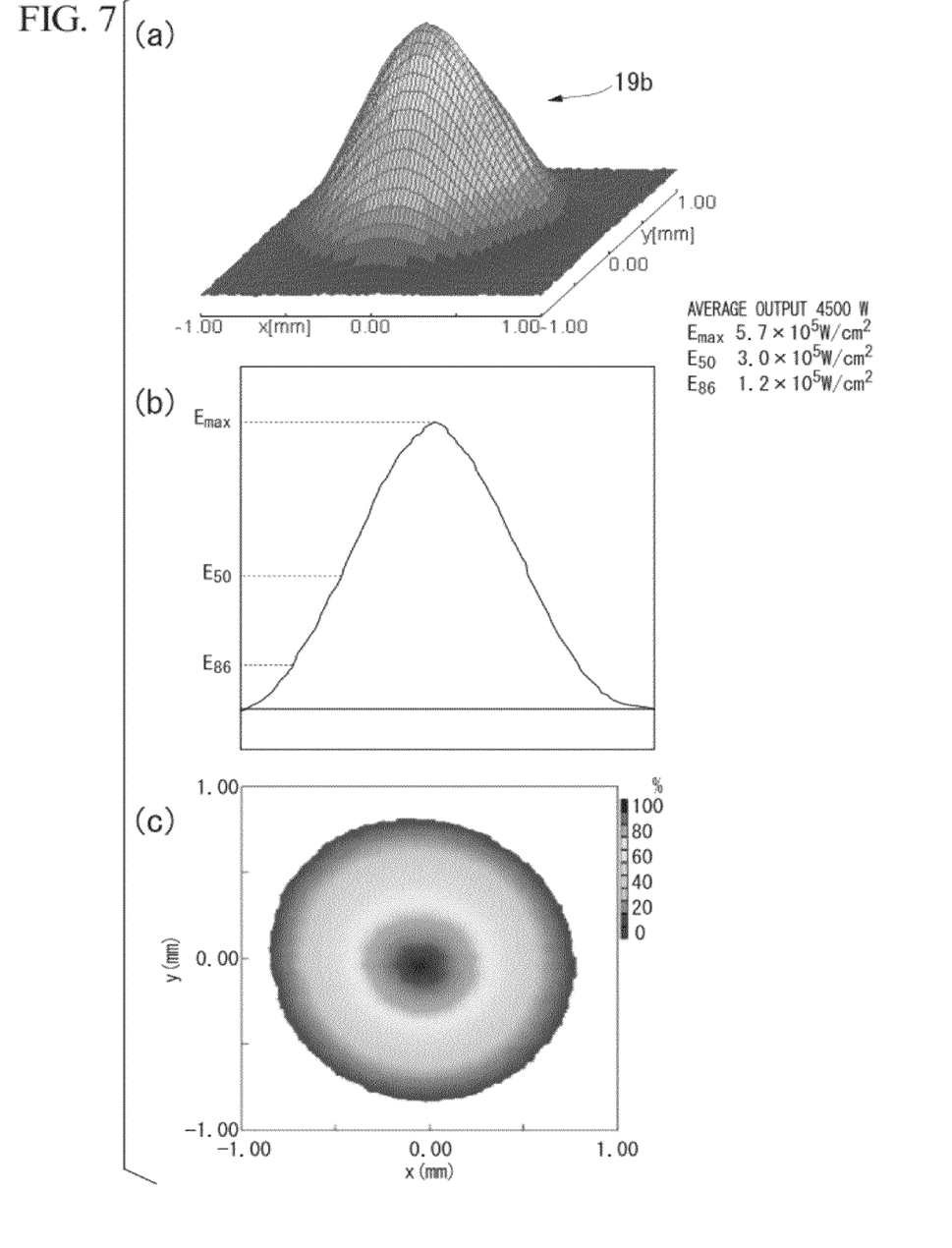
FIG. 7(a) is a three-dimensional view showing an energy distribution profile of the irradiated face of the defocusing beam according to yet another embodiment.
FIG. 7(b) is a cross-sectional view taken in an irradiating direction including the peak section of FIG. 7(a)
FIG. 7(c) is an energy distribution view of the irradiated face.

A defocusing beam 19b shown in FIG. 7 has an average output of 4500 W, a peak energy density $E_{max}$ of $5.7 \times 10^5$ W/cm², an energy density $E_{50}$ of $3.0 \times 10^5$ W/cm², and an energy density $E_{86}$ of $1.2 \times 10^5$ W/cm². A fraction of the energy density $E_{50}$ with respect to the peak energy density $E_{max}$ is 52.6%, and a fraction of the energy density $E_{86}$ with respect to the peak energy density $E_{max}$ is 21.1%.

In the welding based on the defocusing beam 19b, the dumbbell-shaped member 5 and the stiffening ring 4 are not melted and cannot be welded. This is attributed to the peak energy density $E_{max}$ of $5.7 \times 10^5$ W/cm², and the energy density E of the peak section being insufficient.

Next, the dumbbell-shaped member 5 formed of niobium and the stiffening ring 4 are welded using a defocusing beam having a distribution profile of energy density that is different from that of the defocusing beam 11 according to the first embodiment, and then a relationship between the peak energy density $E_{max}$ and the fraction of the energy density $E_{50}$ with respect to the peak energy density $E_{max}$ and a welded state is checked.

Figure 8:
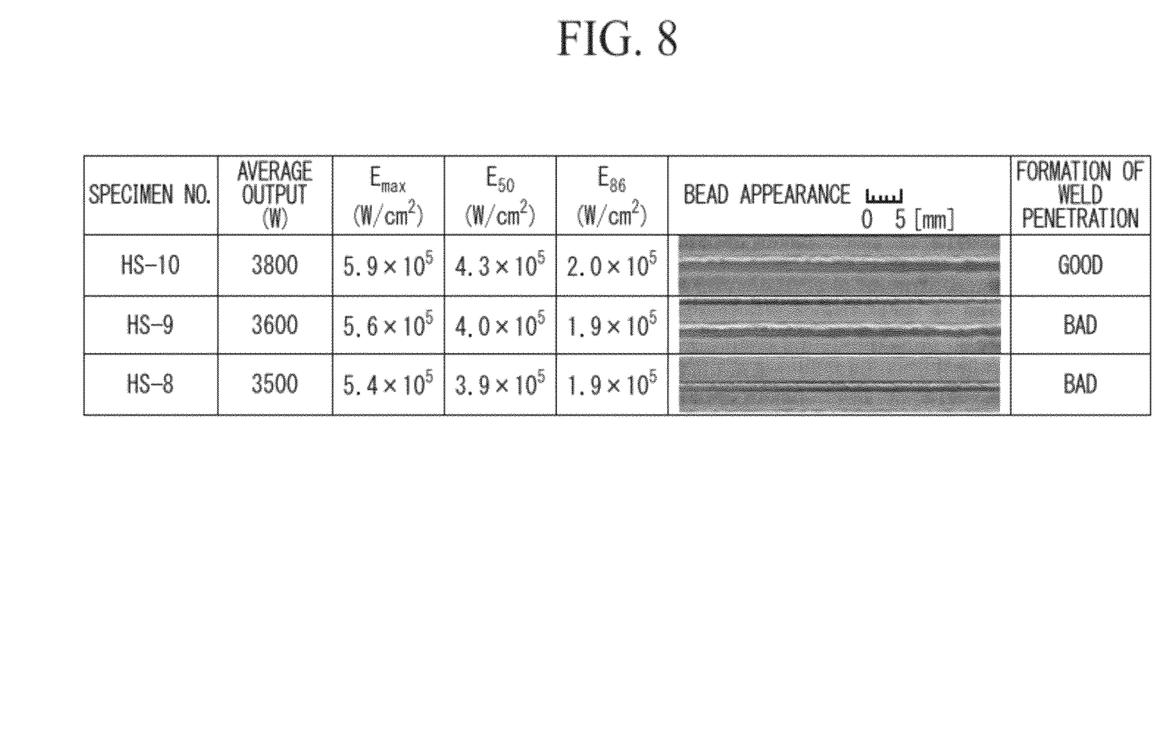
FIG. 8 shows comparison of welded states using defocusing beams having different average outputs.

When welding was performed with specimens HS-10, HS-9, and HS-8 listed in FIG. 8, HS-10 could be welded, while HS-9 and HS-8 could not be welded.

It can be seen from this that, even if the defocusing beam having a different average output has the peak energy density $E_{max}$ higher than $5.8 \times 10^5$ W/cm², the partial penetration welding can be performed under the control of a depth of penetration.

Next, another embodiment will be described with reference to the attached drawings. The same symbols will be used for members or parts that are the same as or similar to those of the first embodiment described above, and so description thereof will be omitted. Thus, the configurations different from those of the first embodiment will be described.

As shown in FIGS. 9(a) and 9(b), in a welding method according to a second embodiment, laser welding is carried out while an inert gas G is supplied.

The inert gas G is supplied to an irradiated face 13 of a defocusing beam 11, the front and rear of the irradiated face 13 in a welding direction, a reverse face of the irradiated face 13 inside a tube body 3 of a superconducting accelerator tube 1, and a space 25 between a dumbbell-shaped member 5 and a stiffening ring 4.

Figure 9:
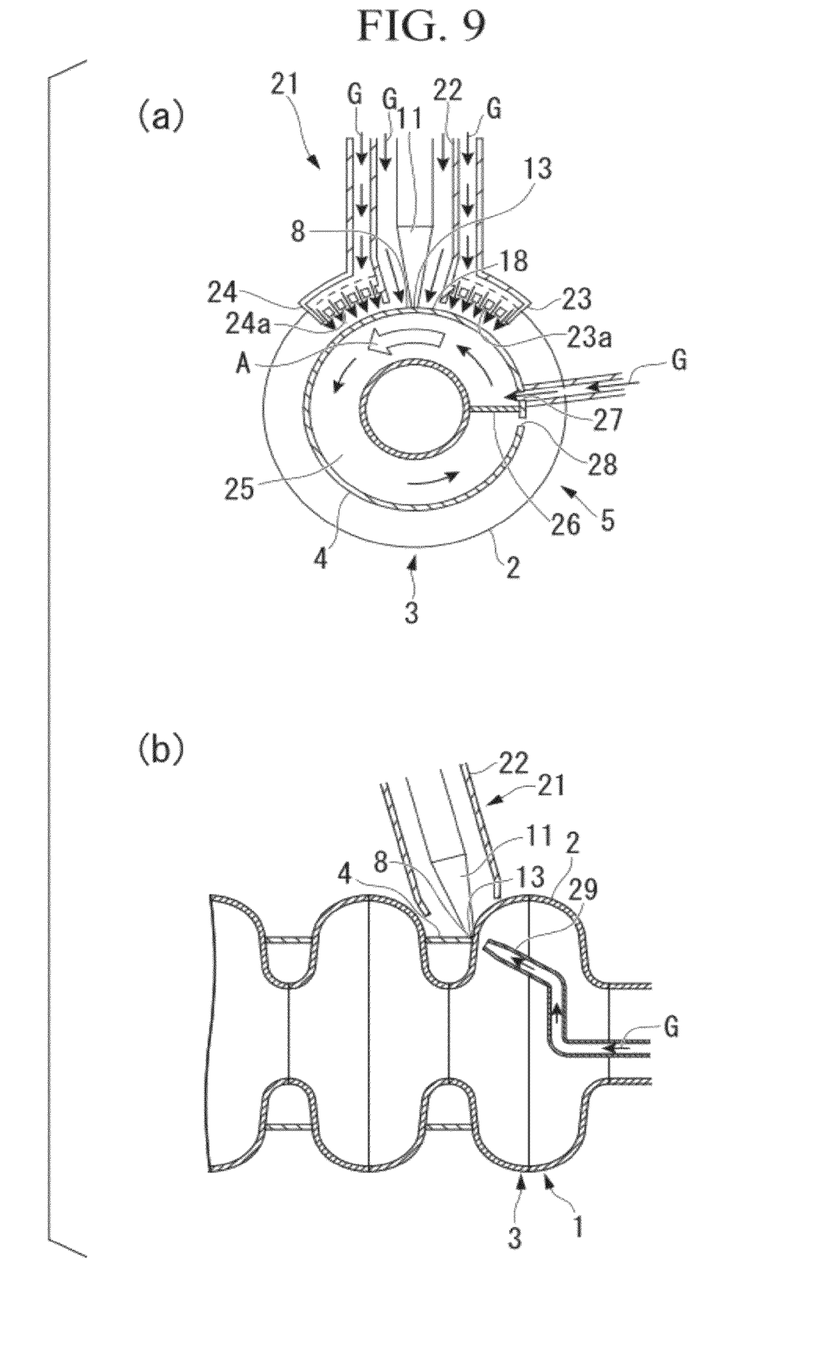
FIGS. 9(a) and 9(b) are explanatory views of a welding method according to a second embodiment.

In the present embodiment, the dumbbell-shaped member 5 and the stiffening ring 4 are welded while being rotated in a direction of arrow A of FIG. 9. Here, a welding direction is reverse to the direction of arrow A.

As shown in FIG. 9(a), inert gas supplying means 21 for supplying the inert gas G to the irradiated face 13 of the defocusing beam 11 and the front and rear of the irradiated face 13 in the welding direction includes a center nozzle 22 installed so as to surround the defocusing beam 11, a front nozzle 23 installed in front of the center nozzle 22 in the welding direction, and a rear nozzle 24 installed in the rear of the center nozzle 22 in the welding direction. The inert gas supplying means 21 is installed apart from the stiffening ring 4 by a predetermined interval, and faces 23a and 24a of the front and rear nozzles 23 and 24 which are opposite to the stiffening ring 4 are formed as curved faces corresponding to a cylindrical shape of the stiffening ring 4.

When a welding task is performed, the inert gas G is supplied from the center nozzle 22, the front nozzle 23, and the rear nozzle 24 at the same time.

As shown in FIG. 9(b), the inert gas G is supplied to a reverse face of the irradiated face 13 inside the tube body 3 of the superconducting accelerator tube 1 by a reverse face-side nozzle 29 installed toward the reverse face of the irradiated face 13.

Alternatively, the welding may be performed in the state in which the reverse face of the irradiated face 13 inside the tube body 3 as well as the entire interior of the tube body 3 is under an inert gas atmosphere.

Further, as shown in FIG. 9(a), the supply of the inert gas G to the space 25 between the dumbbell-shaped member 5 and the stiffening ring 4 is performed as follows.

A partition plate 26 is installed in the space 25, so as to partition the space 25 in a circumferential direction. Gas in the space 25 is unable to pass through the partition plate 26. The stiffening ring 4 is provided with a supply port 27 through which the inert gas G is supplied to the space 25 on one side of circumferential direction to the partition plate 26, and a discharge port 28 that discharges air of the space 25 on the other side of circumferential direction to the partition plate 26. The supply port 27 and the discharge port 28 are installed so as to be adjacent to each other via the partition plate 26.

When the inert gas G is supplied from the supply port 27 to the space 25, the gas in the space 25 is discharged from the discharge port 28. In this case, since the space 25 is partitioned with the partition plate 26, the supplied inert gas G moves in the space 25 in the circumferential direction, and is filled in the space 25. Then, the inert gas G is discharged from the discharge port 28.

In the present embodiment, one partition plate 26 is provided. However, a plurality of partition plates 26 may be provided to divide the space 25 between the dumbbell-shaped member 5 and the stiffening ring 4 into a plurality of sub-spaces, and the supply port 27 and the discharge port 28 may be provided to the respective sub-spaces.

The welding method according to the second embodiment produces a similar effect as in the first embodiment, and stably supplies the inert gas G to the weld zone 8. Thereby, the dumbbell-shaped member 5 and the stiffening ring 4 can be prevented from being oxidized.

Further, in comparison with a method of performing welding with an entire chamber under an inert gas atmosphere, in the welding method according to the second embodiment, the dumbbell-shaped member 5 and the stiffening ring 4, both of which are intended for welding, can be easily replaced, and the dumbbell-shaped member 5 and the stiffening ring 4 can be easily positioned because no task is performed in the chamber.

Next, a welding method according to a third embodiment will be described with reference to the figures.

Figure 10:
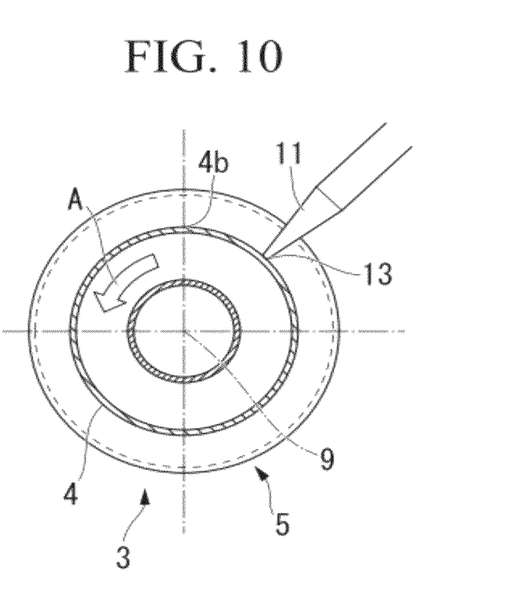
FIG. 10 is an explanatory view of a welding method according to a third embodiment.

As shown in FIG. 10, the welding method according to the third embodiment is carried out so that a dumbbell-shaped member 5 and a stiffening ring 4 are installed such that axial directions thereof are in a horizontal direction, and are rotated about the central axis 9 thereof in a direction of arrow A of FIG. 10. Then, an irradiated face 13 of a defocusing beam 11 is rotated from an upper end 4b of the stiffening ring 4 whose axial direction is in the horizontal direction within a range of 0° to 90° in a direction opposite to the direction of arrow A of FIG. 10, and is located at the same height as the central axis 9 or on an upper side of the central axis 9. Preferably, the irradiated face 13 is located at an angle between 5° and 45° at which it is rotated from the upper end 4b of the stiffening ring 4 in the direction opposite to the direction of arrow A of FIG. 10.

The welding method according to the third embodiment produces a similar effect as in the first embodiment. A metal melted by irradiation of a defocusing beam 11 moves toward the upper side due to rotation of the dumbbell-shaped member 5 and the stiffening ring 4, and is solidified. Thus, the metal does not flow toward the irradiated face 13 to which the defocusing beam 11 is irradiated. As such, in the welding method according to the third embodiment, the welding can be efficiently performed.

While the embodiments of the welding method of the present invention have been described, the present invention is not limited to the embodiments, and can be adequately modified without departing from the scope and spirit thereof.

For example, in the embodiments described above, the superconducting accelerator tube 1 and the stiffening rings 4 are formed of pure niobium. However, they may be formed of a metal other than pure niobium or a material containing niobium.

Further, in the second embodiment described above, the inert gas G is supplied to the irradiated face 13 and the front and rear of the irradiated face 13 in the welding direction. However, the inert gas G may be supplied only to the irradiated face 13 depending on a welding speed or a depth of penetration required for the weld zone 8. Further, the welding may be carried out under an inert gas atmosphere using another method of supplying the inert gas G.

INDUSTRIAL APPLICABILITY

According to the present invention, the metal material forming the superconducting accelerator tube body and the stiffening member can be melted by the peak section of the laser beam. On the weld zone between the superconducting accelerator tube body and the stiffening member, the circumferential surface of the keyhole has a smooth shape, and the bead having a small aspect ratio is formed. This suppresses the generation of the blowholes, and allows the partial penetration welding to be carried out without the bead passing through the body of the superconducting accelerator tube or without the convexity being formed on the reverse face to the welding face of the body of the superconducting accelerator tube. As a result, the superconducting accelerator tube body and the stiffening member can be efficiently welded, and the manufactured superconducting accelerator tube and superconducting accelerator can be stabilized in quality.

DESCRIPTION OF REFERENCE NUMERALS

1: superconducting accelerator tube
3: tube body (superconducting accelerator tube body)
4: stiffening ring (stiffening member)
6: iris section
8: weld zone
9: central axis
11: defocusing beam (laser beam)
11*a*: peak section
11*c*: region
11*d*: outer circumference
13: irradiated face
21: inert gas supplying means
22: center nozzle
23: front nozzle
24: rear nozzle
25: space
26: partition plate
27: supply port
28: discharge port
29: reverse face-side nozzle
G: inert gas

What is claimed is:

1. A welding method for welding a cylindrical stiffening member to an outer circumference of a superconducting accelerator tube body using a laser beam in a process of manufacturing a superconducting accelerator tube, the welding method comprising:

butting the cylindrical stiffening member and the superconducting accelerator tube body to form a butting portion as an irradiated face;

irradiating a defocusing beam, as the laser beam, to the butting portion; and welding the butting portion between the cylindrical stiffening member and the superconducting accelerator tube body by melting the butting portion with the defocusing beam, wherein the laser beam is configured such that a distribution profile of energy density on the irradiated face to which the laser beam is irradiated is a Gaussian distribution profile having a peak section and an outer edge section, and the energy density of the peak section is $5.8 \times 10^5$ W/cm$^2$ or more, the energy density of an outer circumference of a region in which 50% of the total energy in the distribution profile of the energy density is included centered on the peak section is less than or equal to 75% of the energy density of the peak section, and the defocusing beam includes:

a first region which evaporates and melts metal of the butting portion, the first region being configured of the peak section; and a second region which melts the metal of the butting portion without evaporation, the second region being configured of the outer edge section.

2. The welding method according to claim 1, wherein the metal of the superconducting accelerator tube body and the stiffening member is formed of niobium.

3. The welding method according to claim 1, further comprising supplying the irradiated face, front and rear of the irradiated face in a welding direction, and a reverse face of the irradiated face inside the superconducting accelerator tube body with an inert gas.

4. The welding method according to claim 3, wherein the supplying comprises supplying the inert gas from a center nozzle installed so as to surround the laser beam, a front nozzle installed in front of the center nozzle in the welding direction, a rear nozzle installed rearward of the center nozzle in the welding direction, and a reverse face-side nozzle installed toward the reverse face of the irradiated face inside the superconducting accelerator tube body.

5. The welding method according to claim 1, further comprising supplying an inert gas between the cylindrical stiffening member and the superconducting accelerator tube body.

6. The welding method according to claim 5, wherein, between the cylindrical stiffening member and the superconducting accelerator tube body, a partition plate is installed to partition a space in a circumferential direction, and the cylindrical stiffening member includes a supply port through which the inert gas is supplied to an inside thereof on one side of the partition plate in the circumferential direction, and a discharge port that discharges the inert gas from the inside thereof on another side of the partition plate in the circumferential direction.

7. The welding method according to claim 1, wherein
the superconducting accelerator tube body and the cylindrical stiffening member are installed so that central axes thereof are in a horizontal direction, and
the welding comprises:
irradiating the laser beam to an upper side above the central axes of the superconducting accelerator tube body and the cylindrical stiffening member; and
rotating the superconducting accelerator tube body and the cylindrical stiffening member about the central axes in a direction opposite to a direction directed toward the laser beam from an upper end of the superconducting accelerator tube.

8. A superconducting accelerator having the superconducting accelerator tube manufactured by the welding method according to claim 1.

9. A superconducting accelerator having the superconducting accelerator tube manufactured by the welding method according to claim 2.

10. A superconducting accelerator having the superconducting accelerator tube manufactured by the welding method according to claim 3.

11. A superconducting accelerator having the superconducting accelerator tube manufactured by the welding method according to claim 4.

12. A superconducting accelerator having the superconducting accelerator tube manufactured by the welding method according to claim 5.

13. A superconducting accelerator having the superconducting accelerator tube manufactured by the welding method according to claim 6.

14. A superconducting accelerator having the superconducting accelerator tube manufactured by the welding method according to claim 7.

15. The welding method according to claim 3, wherein the supplying of the inert gas occurs during the welding.

16. The welding method according to claim 5, wherein the supplying of the inert gas occurs during the welding.

* * * * *